US 6,708,776 B2

(12) United States Patent
Harwood

(10) Patent No.: US 6,708,776 B2
(45) Date of Patent: Mar. 23, 2004

(54) TURF MANICURING DRAG NET APPARATUS

(76) Inventor: David Michael Harwood, 549 Brethern Church Rd., Jonesboro, TN (US) 37659

(*) Notice: Subject to any disclaimer, the term of this patent is extended or adjusted under 35 U.S.C. 154(b) by 0 days.

(21) Appl. No.: 09/909,368

(22) Filed: Jul. 19, 2001

(65) Prior Publication Data

US 2003/0015329 A1 Jan. 23, 2003

(51) Int. Cl.[7] ............................................. A01B 35/00
(52) U.S. Cl. ..................................... 172/612; 172/684.5
(58) Field of Search ............................. 172/63, 71, 72, 172/682, 311, 452, 456, 694, 518, 519, 539, 540, 612, 611, 189, 34, 684.5; 56/370, 371, 1; 37/219, 221, 222

(56) References Cited

U.S. PATENT DOCUMENTS

| 768,358 | A | * | 8/1904 | Davis | 172/612 |
| 867,731 | A | * | 10/1907 | Johnson | 172/311 |
| 1,530,329 | A | * | 3/1925 | Roberts | 172/612 |
| 2,641,886 | A | * | 6/1953 | Graham | 172/311 |
| 2,749,695 | A | * | 6/1956 | Hoopingarner | 15/257.6 |
| 2,778,182 | A | * | 1/1957 | Malmgren | 172/311 |
| 3,739,860 | A | * | 6/1973 | Rogers | 172/612 |
| 3,992,042 | A |   | 11/1976 | Helmick et al. | |
| 4,019,268 | A |   | 4/1977 | Waterman | |
| 4,316,511 | A | * | 2/1982 | Andersen | 172/456 |
| 4,505,338 | A | * | 3/1985 | Koval et al. | 172/611 |
| 4,570,722 | A | * | 2/1986 | Osborn | 172/311 |
| 4,651,451 | A |   | 3/1987 | Beeley et al. | |
| 5,018,587 | A |   | 5/1991 | Gandrud et al. | |
| 5,143,160 | A | * | 9/1992 | May | 172/311 |
| 5,284,211 | A | * | 2/1994 | Tozer | 172/189 |
| 5,529,321 | A |   | 6/1996 | Thompson | |
| 5,833,013 | A |   | 11/1998 | Davis | |
| 6,276,698 | B1 | * | 8/2001 | Calandra | 280/18 |

OTHER PUBLICATIONS

Precision Small Engine Company, Precision Catalog 2001, p. 60, Precision Small Engine Company, 2510 NW 16th Lane, Pompano Beach, Florida 33064.

* cited by examiner

Primary Examiner—Thomas B. Will
Assistant Examiner—Alicia Torres
(74) Attorney, Agent, or Firm—Susan F. Johnston

(57) ABSTRACT

A turf manicuring apparatus for enabling dragging of a drag tool such as a net behind a tractor operating across a turf. The apparatus comprises (a) a frame including a rod longitudinally centered about an axis, at least one lift member extending transversely from the rod, and a device for suspending a drag tool from the rod; (b) at least one support member connectable to the tractor and extending away from the tractor to form a receptacle adapted to receive the rod and allow rotation of the rod about the axis, with the support member being adapted to support the frame in an elevated position rearward of the tractor so that the rod is disposed transverse to the direction of movement in a plane substantially parallel with the turf beneath the tractor; (c) a device for rotating the frame about the axis, thus raising and lowering the lift member; and (d) an actuator controllably connected to the device for rotating.

11 Claims, 2 Drawing Sheets

TURF MANICURING DRAG NET APPARATUS

TECHNICAL FIELD

The present invention relates to landscaping and ground surface maintenance, and more particularly relates to an apparatus for the conditioning of a freshly mowed lawn surface such as a golf course fairway and other similarly groomed turf.

BACKGROUND OF THE INVENTION

In the sport of golf, the fairway comprises that portion of a golf hole located between the "tee" and the "green", and excludes the rough, and any trees or hazards. The fairway is to be distinguished from the "rough" and other hazard areas in that it is a carefully manicured lawn section which, in theory, provides a golfer the best possible surface from which to play a shot to the green. The ideal fairway surface comprises a firm ground surface to support the golfer in his or her stance and a smooth, uninterrupted grass surface to support the ball up off the ground surface. It is desirable that the fairway, even though having various contours, provide a consistent grass surface.

Unfortunately, this is often not the case for several reasons. A properly maintained fairway must be mowed frequently. The grass surface of a fairway is cut to a relatively short, uniform length, and conventional operation of a tractor mower results in grass cuttings being distributed behind the path of such tractor mower. Moreover, dew or other surface moisture often causes newly mown grass to collect in clumps. Thus, the turf must be manicured after mowing to provide more even distribution of grass trimmings across the fairway. Even distribution of fairway grass trimmings has been accomplished by dragging a net across the fairway.

U.S. Pat. No. 4,505,338 (Koval) discloses a turf conditioning apparatus that includes a drag net suspended by a support bar that is attached to the rear of a commercial tractor-mower. With this apparatus, the mower operator must stop the tractor-mower, dismount, and remove the drag net from behind the tractor-mower prior to driving across rough areas due to the fact that the net will tend to snag on twigs and other debris found in the rough. The tractor-mower operator must also remove the drag net from behind the tractor-mower prior to reversing the direction of movement of the tractor-mower. Thus, the use of a drag net on the tractor-mower slows down the, often critical, mowing operation.

To overcome the problems encountered with a drag net assembly mounted on the tractor-mower, fairway mowing and dragging are often performed as separate operations, with one person mowing the grass, followed by another person dragging the fairway by driving a utility golf cart equipped with a rear mounted drag net apparatus. Such a golf cart mountable drag net apparatus is available from Precision Small Engine Co., USA on the internet at http://www.precisionusa.com. The labor cost of a two-man operation is naturally more expensive than a one-man operation.

The above-described problems are similarly present in turf manicuring drag systems incorporating heavier drag tools. Heavier drag tools are used for ground leveling, seeding, and fertilizing and include semi-flexible mats and screens.

SUMMARY OF THE INVENTION

The present invention solves the above-described problems in the prior art by providing a turf manicuring drag apparatus that is designed to be used with a tractor and provides a means for raising a drag tool above the turf while the tractor operator remains in his seated position on the tractor. Thus, the present apparatus can be efficiently used in a one-man mowing and turf manicuring operation.

The turf manicuring drag apparatus of the present invention is for use with a tractor and comprises (a) a frame including a rod, at least one lift member extending transversely from said rod to a lift end, and a means for suspending a drag tool from said rod, said rod having a left rod section and a right rod section connected to a center rod section longitudinally centered about an axis;

(b) at least one support member connectable to the tractor and extending away from the tractor to form a receptacle adapted to receive said rod and allow rotation of said rod about said axis, said support member adapted to support said frame in an elevated position rearward of the tractor so that said rod is disposed transverse to the direction of movement in a plane substantially parallel with the turf beneath the tractor with said lift end being rearwardly disposed at an elevation below said rod;

(c) a means for rotating said frame about said axis, thus raising and lowering said lift member; and (d) an actuator controllably connected to said means for rotating.

Another aspect of the present invention is a turf manicuring drag apparatus having left and right rod sections that are pivotably connected to the center rod section so that the end rod sections can be folded toward the center rod section to allow the tractor to be driven through a narrow passage while the turf manicuring drag apparatus is mounted thereon, without encountering lateral obstruction of the rod.

Thus, it is an object of the present invention to provide an improved turf manicuring drag apparatus.

It is another object of the present invention to provide a turf manicuring drag apparatus having an improved means for preventing the apparatus and drag tool from deleteriously contacting interfering objects encountered when the tractor is in motion.

It is yet another object of the present invention to provide a turf manicuring drag apparatus having a means for raising the drag tool above the turf without requiring the tractor operator to stop the tractor or dismount from his seated position.

It is yet another object of the present invention to provide a turf manicuring drag net apparatus for use on a tractor-mower simultaneous with a mowing operation in both a forward and reverse direction of movement.

Other objects, features and advantages of the present invention will become apparent from reading the following specification in conjunction with the accompanying drawings.

DETAILED DESCRIPTION

The present invention is a turf manicuring drag apparatus useful with a tractor operable on a turf. For present purposes, a "tractor" is defined herein as any land automobile adapted for off-road operation. A commercial tractor-mower is described hereinafter for illustration only. "Turf" is defined herein as the surface of the ground, regardless of whether the surface is a grassed surface. Further, while a drag net system is described below, it should be clear the apparatus of the present invention is useful for carrying any type of turf drag tool, including, for example, a heavier drag mat and drag screen useful for turf leveling, seeding, and fertilizing.

Figure 1:
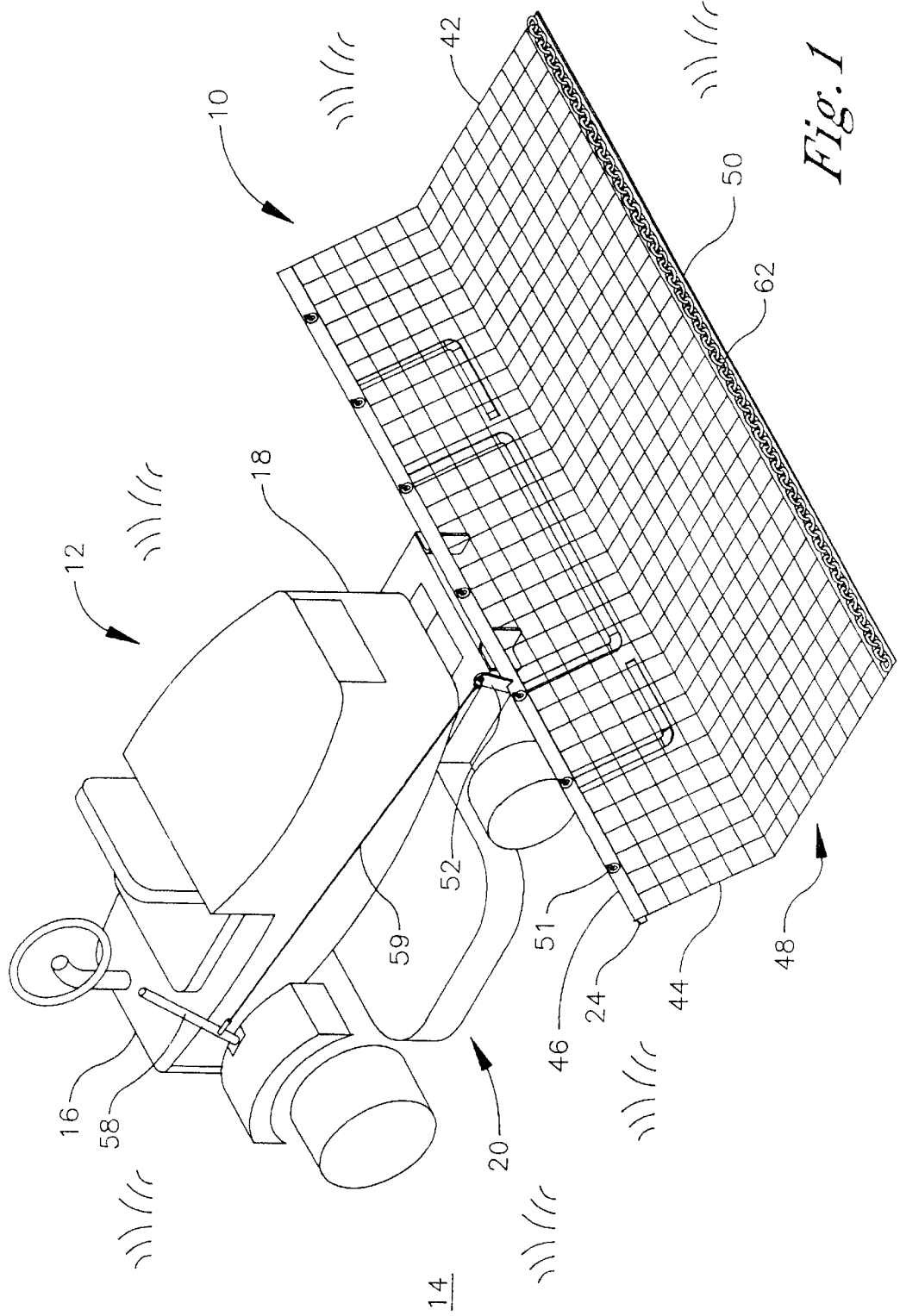
FIG. 1 is an isometric view of the present apparatus mounted on a tractor with a drag net suspended from the apparatus. This view illustrates the apparatus in a lowered position.

Referring now in more detail to the drawings, in which like numerals indicate like parts throughout the several views, FIG. 1 shows the present turf manicuring drag apparatus 10 mounted on a tractor 12 operable on a turf 14. The tractor illustrated is a commercial tractor mower having a forward end 16, a rearward end 18, and a plurality of rotating cutting blade assemblies 20.

Figure 2:
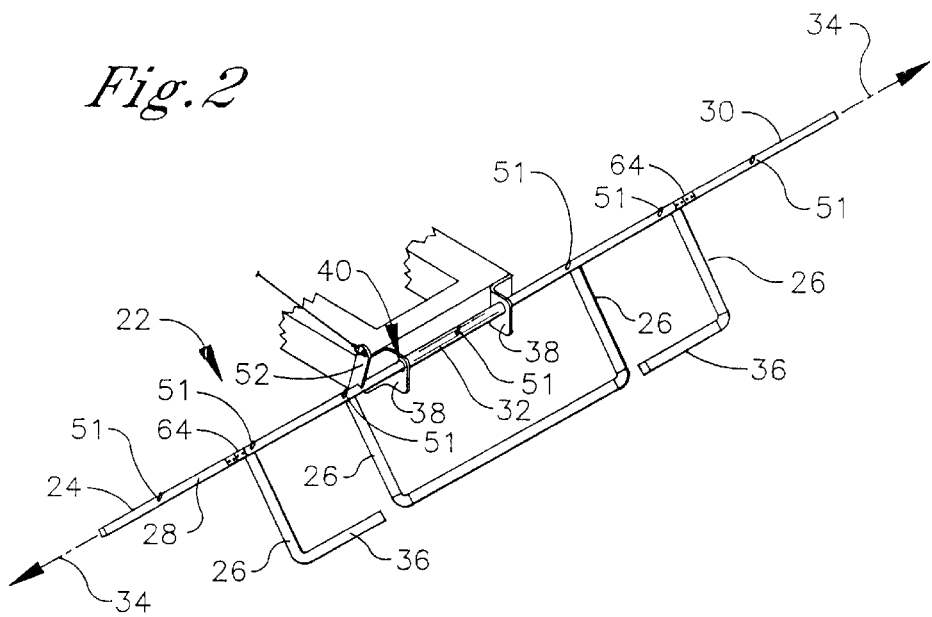
FIG. 2 is an isometric break-away view of the frame and support members connected to a tractor bumper.
Figure 3:
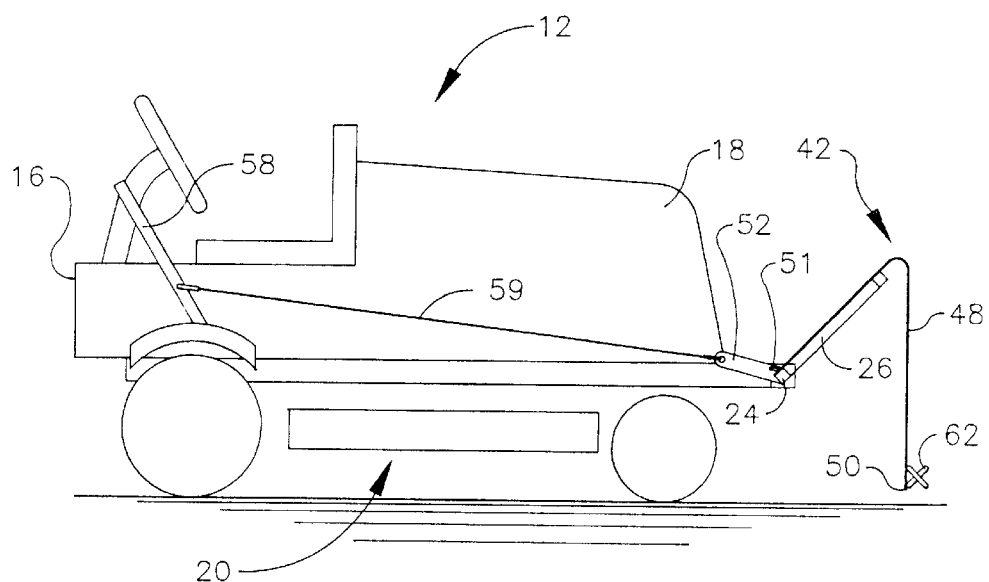
FIG. 3 is an elevation side view of the present apparatus mounted on a tractor and including a net where the frame is in a raised position and the net is elevated above the turf.

As shown more clearly in FIG. 2, the turf manicuring drag apparatus of the present invention includes a frame 22 including a rod 24 adapted for suspending a drag tool therefrom, and at least one lift member 26. The rod 24 is constructed as a left rod section 28 and a right rod section 30 pivotably or rigidly connected to a center rod section 32. The center rod section 32 has a longitudinal axis 34. The frame is positionable near the rearward end 18 of the tractor so that the center rod section 32 is disposed transverse to the forward and reverse direction of movement of the tractor in a plane substantially horizontal with the turf beneath the tractor. The frame is preferably positioned essentially rearward of the tractor, for example either just over or just behind the tractor bumper, as shown in FIGS. 1 and 3.

When the apparatus is mounted on a tractor as shown in FIG. 1, the lift member 26 extends downwardly rearward from the rod 24 to a lift end 36 terminating at an elevation above the turf 14. It is preferable that the apparatus include at least two lift members lying essentially in a single plane. The lift members preferably extend laterally near or at the lift end 36 as shown in FIGS. 1 and 2 in order to provide better lifting of the net.

The present apparatus is further characterized by including at least one support member 38 connectable to the tractor 12 and extending away from the tractor to form a receptacle 40 adapted to receivingly support the rod 24 in the crosswise position. The receptacle 40 is adapted to allow the center rod section 32 to rotate around it's longitudinal axis 34. Therefore, the support member must either be wide enough to stabilize the rod in the crosswise position or else include a plurality of support members to properly distribute the weight of the rod and a drag tool. A pair of support members adapted to extend from each side of a rear tractor bumper is preferable. The receptacle 40 of the support member may include a channel, a ring, a cup, a U-shaped brace, or any other shape to support the rod. The receptacle is preferably equipped with bearings to promote ease of rotation of the rod.

The present turf manicuring drag apparatus further includes a drag tool 42 that provides an agricultural or lawn maintenance benefit by simply being drug across the turf. Examples of drag tools include a flexible net, a semi-rigid mat and screen. For illustration, the drag tool is hereinafter described as a net 42, which is the preferred drag tool in the present invention. The net 42 has a forward portion 44 with a forward edge 46 and a rearward portion 48 with a rearward edge 50. The net 42 is suspended by it's forward edge 46 across the rod 24. The forward portion 44 of the net extends over the lift member 26 and the rearward portion 48 of the net extends rearwardly from the lift rod to contact the turf 14.

The net is suspended from the rod by any known means for suspending an object therefrom such as a corresponding series of hooks and ring members, and stationary fasteners such as rivets, screws, bolts, and high strength hook and loop fasteners. The preferred attaching means includes a set of hooks 51 extending from across the rod to be received through openings in the net. The net is preferably a net having reinforced forward and rearward ends including a series of grommets forming attachment openings.

The present apparatus includes a means for rotating the frame 22 so that the center rod section is rotated about the longitudinal axis 34. Upon forward rotation of the frame in the present invention, the rearward portion 48 of the net is raised off of the turf as the frame 22 is rotated upwardly forward about the longitudinal axis 34, thereby pushing the net up and away from the turf. It should be understood that the left and right rod sections will also be rotated as part of the frame, but they may not necessarily be positioned laterally along the longitudinal axis 34 along with the center rod section. Examples of suitable means for rotating the frame includes, generally, a lever 52 extending from the rod that will effect rotation when pulled as shown in FIG. 2, a shaft disposed in a position sufficient to effect rotation of the rod upon tangential engagement with the rod, a pulley, and a belt. Multiple variations of such general means for rotating will be apparent to those skilled in mechanical arts and are included as part of this invention.

The means for rotating the frame is preferably controlled by an actuator 58. The actuator is controllably connected to the means for rotating and is preferably positionable on the tractor at a position at the forward end of the tractor that is convenient for operation by the tractor operator while remaining in a seated position. The actuator 58 may be a mechanical, electrical, or hydraulic instrument including a pulling mechanism, thrusting mechanism, or turning or rotating mechanism to actuate the means for rotating. Examples are well known in the art and include, without limitation, a winch, a crank, a pull, and a spring. The details of such actuating means are well known in the art. FIG. 3 illustrates a mechanical pulling mechanism connected to the lever 52. An electric actuator may be conveniently powered by direct current from the tractor main battery or auxiliary power source.

A chain 62 or other weighted member may be attached to the rearward edge 50 of the net in order to help keep the net extended across the turf in an outstretched position. Additional drag nets may also be attached in series to the rearward edge 50 of the net, if desired.

The present turf manicuring drag apparatus 10 properly positioned on a tractor in the lowered position with a drag tool suspended therefrom provides turf manicuring when the tractor moves forwardly. Then, when it is desirable to raise the net off of the turf in order to travel across a rough area or to operate the tractor in the reverse direction, the operator can raise the net by engaging the actuator. In the raised position as shown in FIG. 3, the lift members are preferably disposed in a plane below a vertical plane, with the intersection of the plane of the raised position and the plane of the non-raised position preferably forming an angle between about 45° to about 120°.

Another aspect of the present invention is a turf manicuring drag net apparatus wherein the left rod section 28 and the right rod section 30 are pivotably connected to the center rod section 32 so that the left and right rod section may be alternatively positioned substantially in outstretched sequence with the center rod section or else inwardly folded toward the center rod section as desired. The pivotal connection is preferably provided by a hinge 64 between the center rod section and a left and/or right rod section. This aspect is useful in any drag apparatus incorporating a flexible net regardless of whether the frame is rotatable for lifting the net away from the turf.

It should be understood that the present invention has various applications outside the sport of golf. For example, the present invention may be of significant value in other sports where the quality of turf is of direct import to play of the sport. Such sports include baseball, football, soccer, and such. Thus, while this invention has been described in detail with particular reference to preferred embodiments, it will be understood that variations and modifications can be effected within the spirit and scope of the invention as described hereinbefore, the scope of the invention being set forth in the following claims.

What is claimed is:

1. A turf manicuring drag apparatus for use with a tractor operable in a direction of movement on a turf, said apparatus comprising:

(a) a frame including a rod, at least one lift member extending transversely from said rod to a lift end, and a means for suspending a drag tool from said rod, said rod having a left rod section and a right rod section connected to a center rod section longitudinally centered about an axis, said left rod section and said right rod section pivotably connected to said center rod section so that said left rod section and said right rod section are inwardly foldable toward said center rod section;

(b) at least one support member connectable to the tractor and extending away from the tractor to form a receptacle adapted to receive said center rod section and allow rotation of said rod about said axis, said support member adapted to support said frame in an elevated position rearward of the tractor so that said rod is disposed transverse to the direction of movement in a plane substantially parallel with the turf beneath the tractor with said lift end being rearwardly disposed at an elevation below said rod;

(c) a means for rotating said frame about said axis, thus raising and lowering said lift member; and (d) an actuator controllably connected to said means for rotating.

2. The turf manicuring drag apparatus according to claim 1 wherein said frame includes a plurality of said lift members extending from said rod and lying substantially in a single plane.

3. The turf manicuring drag apparatus according to claim 1 wherein said means for rotating includes a lever protruding from said rod, wherein said actuator includes a mechanism adapted to effect rotation of said rod by tilting said lever.

4. The turf manicuring drag apparatus according to claim 1 wherein said actuator is positioned on the tractor so as to be operable from a seated operating position on the tractor.

5. A turf manicuring drag apparatus for use with a tractor operable in a direction of movement on a turf, said apparatus comprising:

(a) a frame including a rod, at least one lift member extending transversely from said rod to a lift end, and a means for suspending a drag tool from said rod, said rod having a left rod section and a right rod section connected to a center rod section longitudinally centered about an axis;

(b) at least one support member connectable to the tractor and extending away from the tractor to form a receptacle adapted to receive said rod and allow rotation of said rod about said axis, said support member adapted to support said frame in an elevated position rearward of the tractor so that said rod is disposed transverse to the direction of movement in a plane substantially parallel with the turf beneath the tractor with said lift end being rearwardly disposed at an elevation below said rod;

(c) a means for rotating said frame about said axis, thus raising and lowering said lift member;

(d) an actuator controllably connected to said means for rotating; and (e) a drag tool having a forward portion and a rearward portion, said drag tool being adapted so that said forward portion is extendable over said lift member and said rearward portion is extendable rearwardly from said lift member and across the turf when said frame is supported rearward of the tractor by said support member and said forward portion of said drag tool is suspended from said rod.

6. The apparatus according to claim 5 wherein said drag tool is a net.

7. The apparatus according to claim 5 wherein said drag tool is a mat.

8. The apparatus according to claim 5 wherein said drag tool is suspended from said left and right rod sections and said center section.

9. The apparatus according to claim 5 wherein said means for rotating includes a lever protruding from said rod, wherein said actuator includes a mechanism adapted to effect rotation of said rod by tilting said lever.

10. The apparatus according to claim 5 wherein said actuator is positioned on the tractor so as to be operable from a seated operating position on the tractor.

11. The turf manicuring drag apparatus of claim 5 wherein said frame includes a plurality of said lift members extending from said rod and lying substantially in a single plane.

* * * * *